No. 729,996. PATENTED JUNE 2, 1903.
W. R. BONNELL.
BACK PRESSURE VALVE FOR TRAPS.
APPLICATION FILED SEPT. 13, 1902.
NO MODEL.
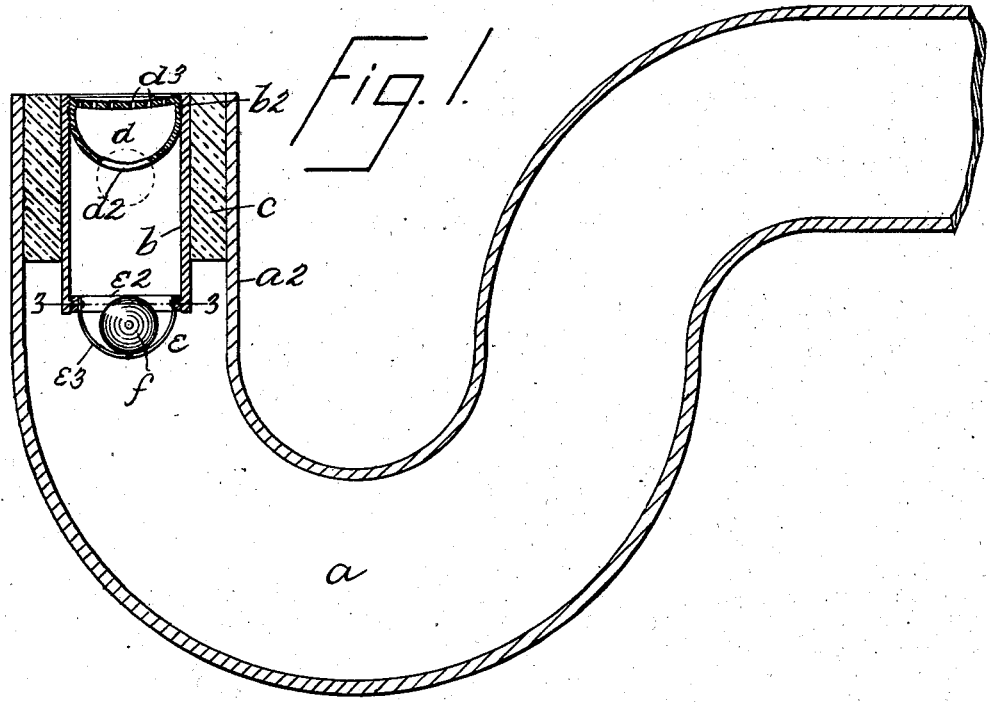
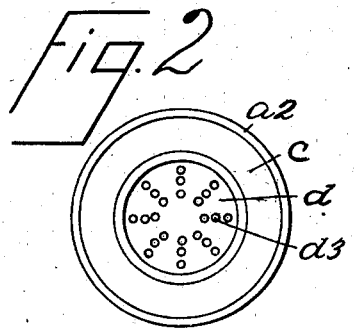
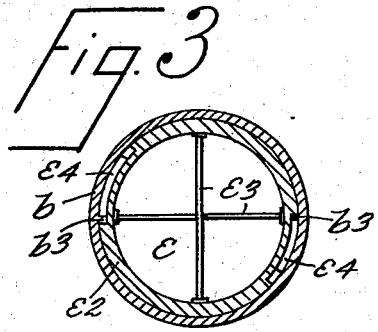
WITNESSES
INVENTOR
William R. Bonnell
BY
Edgar Tate & Co
ATTORNEYS No. 729,996. Patented June 2, 1903.

UNITED STATES PATENT OFFICE.

WILLIAM R. BONNELL, OF ELIZABETH, NEW JERSEY, ASSIGNOR OF ONE-FOURTH TO GRACE MAY LEVI, OF ELIZABETH, NEW JERSEY.

BACK-PRESSURE VALVE FOR TRAPS.

SPECIFICATION forming part of Letters Patent No. 729,996, dated June 2, 1903.

Application filed September 13, 1902. Serial No. 123,206. (No model.)

*To all whom it may concern:*

Be it known that I, WILLIAM R. BONNELL, a citizen of the United States, residing at Elizabeth, in the county of Union and State of New Jersey, have invented certain new and useful Improvements in Back-Pressure Valves for Traps, of which the following is a full and complete specification, such as will enable those skilled in the art to which it appertains to make and use the same.

The object of this invention is to provide an improved back-pressure valve for traps or sinks designed for use in cellars, kitchens, closets, and other places of this kind; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a vertical section of an ordinary sink-trap provided with my improvement; Fig. 2, a plan view of the entrance-tube of the trap and showing my improvement therein, and Fig. 3 a section on the line 3 3 of Fig. 1.

In the drawings forming part of this specification I have shown at $a$ an ordinary sink-trap, and in the practice of my invention I secure in the entrance-tube $a^2$ thereof a valve-casing $b$, which is tubular in form, and this connection is preferably made by means of a tubular bushing or packing $c$, which may be composed of any suitable material. The valve-casing $b$ is tubular in form, and the upper end thereof is screw-threaded internally, as shown at $b^2$, and screwed thereinto is a stopper $d$, which is hollow and substantially semispherical in form, the convex side thereof being directed downwardly and provided with a port or passage $d^2$, while the upper side thereof is concave in form and perforated, as shown at $d^3$.

In the lower end of the valve-casing $b$ is placed a detachable valve-cage $e$, comprising a ring $e^2$ and cup-shaped cross-wires $e^3$, and in this cage is placed a ball-valve $f$. The ring $e^2$ of the valve-cage $e$ is connected with the valve-casing $b$ by means of a bayonet-joint, said valve-casing being provided with inwardly-directed lugs or projections $b^3$ and the ring $e^2$ with corresponding L-shaped slots $e^4$; but this connection may be made in any desired manner, all that is necessary being to provide means whereby the valve-cage may be inserted and removed from the top of the valve-casing.

The stopper $d$ may be screwed into the valve-casing or removed therefrom when desired by means of an ordinary spanner, and the operation will be readily understood from the foregoing description when taken in connection with the accompanying drawings and the following statement thereof.

The valve $f$ may be composed of rubber or any suitable material, and it will be apparent that any back pressure through the trap will cause said valve to rise and close the port or passage $d^2$, as indicated in dotted lines in Fig. 1, and the relative dimensions of the valve $f$ and the valve-casing $b$ are such that the valve $f$ when raised into the position shown in dotted lines in Fig. 1 will always close the port or passage $d^2$.

Whenever it is desired to clean out the trap $a$ or repair the same, the plug $d$ and the valve-cage $e$, with the valve $f$, may all be removed, as will be readily understood, and the trap may be cleaned through the valve-casing $b$, and, if desired, the valve-casing $b$ and the tubular casing or backing $c$ may also be removed.

Having fully described my invention, what I claim as new, and desire to secure by Letters Patent, is—

1. A sink-trap the entrance-arm of which is provided with a tubular valve-casing in the bottom of which is secured a detachable valve-casing provided with a spherical valve and the upper end of said casing being closed by a detachable hollow plug which is substantially semispherical in form, the convex side thereof being directed downwardly and provided with a central port or passage, and the upper side thereof being perforated, substantially as shown and described.

2. A back-pressure-valve casing for water-traps, a perforated screw-threaded hollow plug in the top of said casing, a port or passage in the lower member of said hollow plug, a hollow ball-valve operating in said casing and with said port or passage and means for holding said ball-valve within said casing, consisting of a detachable cage in the bottom thereof, substantially as shown and described.

In testimony that I claim the foregoing as my invention I have signed my name, in presence of the subscribing witnesses, this 12th day of September, 1902.

WILLIAM R. BONNELL.

Witnesses:
F. A. STEWART,
C. E. MULREANY.